United States Patent [19]

Crum

[11] 4,100,663

[45] Jul. 18, 1978

[54] CARBURETOR, KIT AND TOOL FOR USE THEREIN

[76] Inventor: James R. Crum, P. O. Box 1271, St. Charles, Mo. 63301

[21] Appl. No.: 792,216

[22] Filed: Apr. 29, 1977

[51] Int. Cl.[2] .......... B23P 15/00

[52] U.S. Cl. .......... 29/156.4 R; 29/401 B; 29/401 F; 81/71; 261/34 R; 261/23 A; 261/71

[58] Field of Search .......... 29/156.4 R, 401 B, 401 F, 29/401 R; 145/50 A; 81/71; 261/34 R, DIG. 38, 71, 23 A

[56] References Cited

U.S. PATENT DOCUMENTS

| | | | |
|---|---|---|---|
| 624,875 | 5/1899 | Sawyer et al. | 145/50 A |
| 1,255,165 | 2/1918 | Hefler | 261/121 A |
| 1,886,155 | 11/1932 | Bohlman | 81/71 |
| 2,015,878 | 10/1935 | Trotter | 145/50 A |
| 2,098,515 | 11/1937 | Pardieck | 145/50 A |
| 2,725,212 | 11/1955 | Jenson | 261/71 |
| 2,733,456 | 2/1956 | Howell | 81/71 |
| 2,788,816 | 4/1957 | Dargols | 145/50 A |
| 2,966,344 | 12/1960 | Ball | 261/23 A |
| 2,987,304 | 6/1961 | Roy | 261/44 R |
| 3,409,277 | 11/1968 | Reise | 261/34 R |
| 3,758,082 | 9/1973 | Kertell | 261/23 A |
| 3,807,707 | 4/1974 | Johnson | 261/34 R |
| 3,983,189 | 9/1976 | Taylor | 261/23 A |

FOREIGN PATENT DOCUMENTS

| | | | |
|---|---|---|---|
| 2,258,225 | 8/1973 | Fed. Rep. of Germany | 261/23 A |
| 2,134,738 | 1/1972 | Fed. Rep. of Germany | 145/50 A |

*Primary Examiner*—C.W. Lanham
*Assistant Examiner*—Daniel C. Crane
*Attorney, Agent, or Firm*—Polster, Polster and Lucchesi

[57] ABSTRACT

Changing the jets of a Holley carburetor is greatly simplified by an L-shaped adapter which permits the jets to face upward. The jets are removed through access holes drilled in the upper wall of the float bowl by a special screwdriver/gripping tool.

8 Claims, 6 Drawing Figures

CARBURETOR, KIT AND TOOL FOR USE THEREIN

BACKGROUND OF THE INVENTION

This invention relates to a means for changing carburetor jets of high performance automobile carburetors such as those which have been manufactured for many years by the Holley Carburetor Division of Colt Industries, Warren Michigan. Such carburetors include a metering block attached to the side or sides of the carburetor and a float bowl attached to the side of the metering block. Jets threaded into the metering block, on the float bowl side, control the flow of gasoline into the carburetor. When changes in temperature, humidity, air density or driving style (such as from road use to racing use) occur, the jets must be changed for optimum performance. Unfortunately, changing the jets requires draining the float bowls, and then removing the float bowl and float assembly. The job is difficult, time-consuming and hazardous, and quickly wears out the gasket between the metering block and float bowl.

SUMMARY OF THE INVENTION

One of the objects of this invention is to provide a simple, rapid and safe means for replacing the jets of a carburetor having side-mounted float bowls.

Another object is to provide such means which are themselves simple and which are adapted to be installed easily on existing carburetors.

Other objects will become apparent in light of the following description and accompanying drawings.

In accordance with one aspect of this invention, generally stated, an improved carburetor is provided of the type including a carburetor body, a metering block, a float bowl, and one or more jets threaded into the metering block, wherein the improvement comprises means on the metering block defining an upwardly facing bore into which the jet is removably mounted, and a closable opening in an upper wall of the float bowl through which the jet can be removed. In the preferred embodiment, the upwardly facing bore is provided in an adapter including a generally right angled passage, one end of which is externally threaded and the other end of which internally threaded. The externally threaded portion and internally threaded portion are sized and threaded identically with the jet. Thus, the externally threaded portion may be threaded into the metering block in place of the jet and the jet threaded into the internally threaded portion of the adapter. Holes drilled in the upper wall of the float chamber provide access for a special screwdriver/gripping tool which also forms a part of the invention. The tool includes a screwdriver, over the shaft and blade of which is fitted a partially split collet. Removable plugs close the holes. The adapters, plugs and screwdriver/-gripping tool form a kit for converting an existing carburetor to one with easily changed jets.

Other aspects of the invention will be more readily understood in view of the following description of the preferred embodiment.

DESCRIPTION OF THE PREFERRED EMBODIMENT

Figure 2:
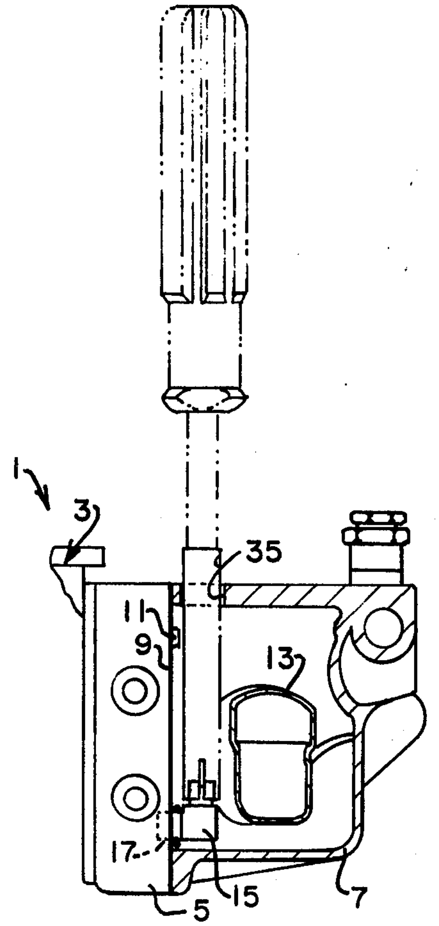
FIG. 2 is a sectional view taken along line 2—2 of FIG. 1.
Figure 3:
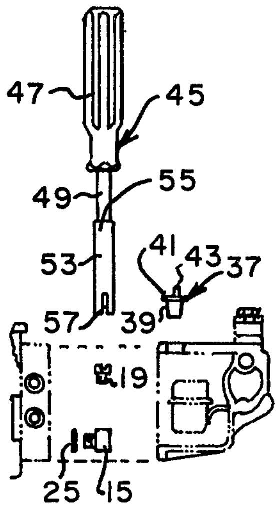
FIG. 3 is an exploded view, corresponding to FIG. 2, showing the assembly of a quick-change jet kit of the present invention in a carburetor as shown in FIGS. 1 and 2.
Figure 5:
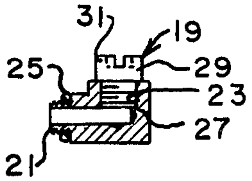
FIG. 5 is a sectional view taken along the line 5—5 of FIG. 4.

Referring now to the drawings, reference numeral 1 indicates a Holley automobile carburetor with center-hung float bowls. The carburetor 1 includes a carburetor body 3 having mounted on one side a metering block 5. A float bowl 7 is mounted to the side of the metering block 5. A gasket 9 is positioned on the metering block 5 by means of pins such as the one indicated by reference numeral 11. A float 13 is pivotably mounted in the float bowl 7. This construction is entirely standard, and is characteristic of Holley center-pivot float bowl carburetors.

Adapters 15 are screwed into the threaded bores, indicated at 17, which ordinarily receive jets 19. Each adapter 15 is formed as a brass block having an externally threaded nipple 21 and an internally threaded bore 23 forming a right-angled passage through the adaptor body. The threads on the nipple 21 mate with those in the meter block bore 17 and are so positioned that when the adapter has been screwed in sufficiently to compress slightly an O-ring 25 on the nipple 21, the bore 23 faces upwardly. The threads in the bore 23 mate with the threads on a stem portion 27 of the jets 19. The jets 19 also include a head portion 29 having a slotted rim 31. A central opening 33 in the jets acts to meter the flow of gasoline through the adapter 15 and into the metering block 5.

Two holes 35 are provided in the upper wall of the float bowl 7, directly above the respective upwardly facing jets 19. Each hole 35 is larger than the diameter of the head 29 of the jet 19, to accomodate a jet removal tool as explained hereinafter. Molded plastic plugs 37 are friction fit into the holes 35. Each plug 37 includes a tapered body part 39, a protective skirt 41, and a finger tab 43 extending upwardly from the plug.

The jets 19 are removed by means of a screwdriver/-gripper tool 45, inserted through the holes 35 in the top of the float bowl. The tool 45 includes the usual screwdriver handle 47, shank 49 and blade 51. A steel tube 53 is fitted over the shaft 49 and crimped to it, as indicated at 55. The steel tube 53 is made of full hard rolled steel tubing having a wall thickness of about 0.025 inch. The end of the tube 53 overhangs the end of the blade 51 about one sixteenth of an inch. A pair of longitudinal slots 57 at the lower end of the tube 53 allow a very slight spreading of the merlon portions of the tube 53, so that the tube 53 acts as a collet. The collet 53 is sized to grip tightly the head 29 of the jet 19, while the blade 51 engages the slot in the rim 31 of the jet.

Figure 1:
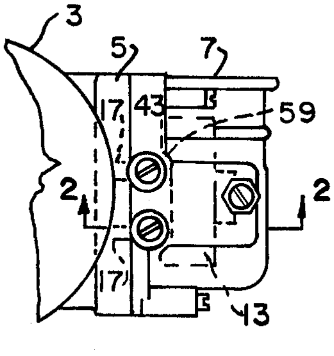
FIG. 1 is a top plan view, partially broken away, of a carburetor equipped with the quick-change jets of the present invention.
Figure 4:
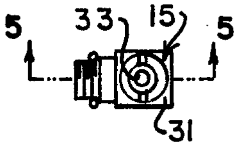
FIG. 4 is a top plan view of a carburetor jet adapter of the present invention.
Figure 6:
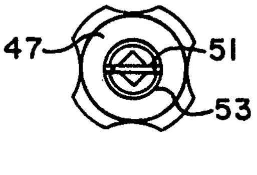
FIG. 6 is an end view, viewed from the blade end, of a screwdriver/gripper tool of the present invention.

Adapters 15, O-rings 25, plugs 37 and screwdriver/-gripping tool 45 are supplied, together with a template, as a kit for converting a standard Holley carburetor with center-hung float bowls to the improved carburetor hereinbefore described. The conversion is easily accomplished. The float bowl or float bowls are removed in the same manner as for changing the jets of the standard carburetor. The jets are then unscrewed from the metering block 5, and are replaced by the brass adapters 15. The adapters 15 are tightened until the O-ring 25 touches the casting with the bore 23 facing straight up. The upper gasket locating pins 11 on the metering block are then filed down sufficiently to provide clearance for the screwdriver/gripping tool 45. The float is removed from the float bowl, and two three-eighths inch holes are drilled in the upper wall of the float bowl 7 with the aid of a template. The float is then replaced in the float bowl, and the center of the float is pushed inwardly about one-eighth inch, using thumb pressure. A screwdriver is then inserted through the holes 35 and the shaft of the screwdriver is used to pry a clearance crease at each end of the central indentation, as indicated at 59 in FIG. 1. The float 13 is straightened and then checked for leaks by submersion in water. The float bowl 7 is reassembled to the metering block 5. Each jet 19 is installed by pressing the head 29 of the jet 19 in the collet 53 of the tool 45, inserting the jet through the hole 35, screwing it snugly into the adapter 15, pulling out the tool 45 and pressing the plug 37 firmly in place in the hole 35.

The float 13 is adjusted in the normal manner.

Whenever conditions require changing jets 19, the plugs 37 are removed, the tool 45 is inserted with the collet 53 gripping the head 29 of the jets 19 and the blade 57 inserted in the slot in the rim 31, the jet is unscrewed and extracted, and a standard jet 19 with a different sized aperture 33 is inserted. No dangerous removal of the float bowl, with its attendant spillage of gasoline on hot manifolds, is necessary.

It has been found that the adapter 15 has no effect on the operation of the jet 19, and that the performance of the carburetor 1 is therefore totally unaffected by the use of the adapter of the present invention. At the same time, the ease with which the jets can be replaced with other standard jets encourages the use of properly sized jets for all operating conditions of the carburetor and engine to which it is attached.

Numerous variations in the carburetor, adapter, kit and tool of the present invention, all within the scope of the appended claims, will occur to those skilled in the art in light of the foregoing disclosure. For example, the illustrative embodiment of carburetor is a two barrel carburetor. Four barrel carburetors, having a second float bowl on an opposite side of the carburetor body, require four adapters and four plugs.

I claim:

1. A method of simplifying changing the jets of a carburetor of the type including a carburetor body, a metering block on the side of the carburetor body, a pair of jets threaded into the exterior of the metering block, and a float chamber defined in part by said metering block and in part by a float bowl, said method comprising, in a desired order, the steps of:

replacing said jets with adapters, each adapter including an L-shaped passage, one end of said passage communicating with the metering block and the other end forming an upwardly facing threaded bore for threaded replacement jets, providing access opening means in an upper wall of said float bowl for removing said replacement jets from said adapters and replacing said replacement jets in said adapters without removing said float bowl from said metering block, and assembling said replacement jets within said upwardly facing threaded bores of said adapters.

2. The method of claim 1 wherein said replacement jets include a threaded stem portion, a head portion, a slot in said head portion, and a metering aperture extending through said replacement jet, said threaded stem portion and said head portion being sized substantially identically with said first-mentioned pair of jets threaded into the exterior of the metering block.

3. The method of claim 2 wherein said step of assembling replacement jets within said upwardly facing threaded bore is by means of a screwdriver/gripping tool, said tool including a shaft, a blade on said shaft, and gripping means for frictionally engaging the head of said jet while said blade engages said slot, said threaded stem portion and said head portion being sized substantially identically with said first-mentioned pair of jets threaded into the exterior of the metering block.

4. The method of claim 3 wherein said gripping means comprise a tube embracing said blade and at least a part of said shaft of said tool, said tube including longitudinally extending slot means rendering an end of said tube adjacent said blade sufficiently flexible to grasp said head portion frictionally while said blade engages said slot.

5. The method of claim 1 wherein said float bowl includes a metal float, and including a step of bending said float to provide clearance between said access opening means and said replacement jets.

6. The method of claim 1 wherein said access opening means are round holes, said method including a step of inserting removable plugs in said holes.

7. The method of claim 6 wherein said removable plugs are molded of plastic and are friction fit into the holes.

8. The method of claim 7 wherein each plug includes a tapered body part, a protective skirt above said body part, and a finger tab extending upwardly from said body part.

* * * * *